US008105963B2

(12) United States Patent
Nooren

(10) Patent No.: US 8,105,963 B2
(45) Date of Patent: Jan. 31, 2012

(54) COMPOSITION FOR THE PROTECTION OF A SHAPED ARTICLE AGAINST CORROSION

(75) Inventor: Frans Nooren, Stadskanaal (NL)

(73) Assignee: Frans Nooren Afdichtingssystemen B.V., Stadskanaal (NL)

( * ) Notice: Subject to any disclaimer, the term of this patent is extended or adjusted under 35 U.S.C. 154(b) by 0 days.

(21) Appl. No.: 13/012,701

(22) Filed: Jan. 24, 2011

(65) Prior Publication Data
US 2011/0123791 A1 May 26, 2011

Related U.S. Application Data

(60) Continuation of application No. 12/473,120, filed on May 27, 2009, now Pat. No. 7,887,925, which is a division of application No. 10/564,516, filed as application No. PCT/NL2004/000510 on Jul. 14, 2004, now Pat. No. 7,608,343.

(30) Foreign Application Priority Data

Jul. 14, 2003  (EP) .................................... 03077214

(51) Int. Cl.
B32B 25/02 (2006.01)
(52) U.S. Cl. .............. 442/37; 442/41; 442/49; 442/290; 442/304
(58) Field of Classification Search ................... 442/37, 442/41, 49, 290, 304
See application file for complete search history.

(56) References Cited

U.S. PATENT DOCUMENTS

| 4,268,334 | A | 5/1981 | Harris et al. |
| 4,287,034 | A | 9/1981 | Pieslak et al. |
| 4,472,468 | A | 9/1984 | Tailor et al. |
| 4,497,926 | A | 2/1985 | Toy |
| 4,690,958 | A | 9/1987 | Lacoste et al. |
| 4,713,133 | A | 12/1987 | Kent |
| 4,732,412 | A | 3/1988 | Van Der Linden et al. |
| 5,362,572 | A | 11/1994 | Hamada et al. |
| 5,464,886 | A | 11/1995 | Tran et al. |
| 5,621,025 | A | 4/1997 | Toerner et al. |
| 5,817,413 | A | 10/1998 | Huddleston et al. |
| 5,898,044 | A | 4/1999 | Nooren |
| 6,033,776 | A | 3/2000 | Huddleston et al. |
| 6,172,014 | B1 | 1/2001 | Meyers |
| 6,355,318 | B1 | 3/2002 | Tailor et al. |
| 6,465,547 | B1 | 10/2002 | Jackson et al. |
| 6,569,915 | B1 | 5/2003 | Jackson et al. |
| 6,569,927 | B1 | 5/2003 | Gelbin |
| 6,589,346 | B2 | 7/2003 | Schick et al. |
| 6,683,126 | B2 | 1/2004 | Keller et al. |
| 6,794,453 | B2 | 9/2004 | Jackson et al. |
| 6,930,151 | B2 | 8/2005 | Kennedy et al. |
| 7,361,384 | B2 | 4/2008 | Mamish |
| 2003/0114056 | A1* | 6/2003 | Sheely ............................. 442/38 |
| 2004/0028862 | A1 | 2/2004 | Burwell et al. |
| 2004/0191515 | A1 | 9/2004 | Mullen |
| 2005/0234184 | A1 | 10/2005 | Doring et al. |
| 2006/0175578 | A1 | 8/2006 | Nooren |
| 2006/0182950 | A1* | 8/2006 | Yun et al. ....................... 428/343 |
| 2010/0051199 | A1 | 3/2010 | Nooren |

FOREIGN PATENT DOCUMENTS

| CA | 2308802 A1 | 11/2001 |
| DE | 21 00 478 | 11/1971 |
| DE | 201 19 209 U1 | 4/2002 |
| EP | 0 797 02 B1 | 5/1986 |
| EP | 0 232 936 A2 | 8/1987 |
| EP | 0 244 738 A2 | 11/1987 |
| EP | 0 751198 A | 1/1997 |
| EP | 1086 963 A | 8/2001 |
| EP | 0 751 198 B1 | 9/2004 |
| JP | 54-120644 | 9/1979 |
| SU | 747870 | 7/1980 |
| WO | WO 94/12581 A1 | 6/1994 |
| WO | WO-94/22598 | 10/1994 |
| WO | WO 95/24433 A1 | 9/1995 |
| WO | WO 96/28683 A1 | 9/1996 |
| WO | WO 99/48997 | 9/1999 |
| WO | WO 99/48997 A1 | 9/1999 |
| WO | WO 99/56055 A1 | 11/1999 |
| WO | WO 00/52381 A1 | 9/2000 |
| WO | WO 01/70869 A2 | 9/2001 |
| WO | WO 02/31038 A1 | 4/2002 |
| WO | WO 02/066551 A1 | 8/2002 |

(Continued)

OTHER PUBLICATIONS

"Adhesives and Sealants in Buildings", Publication 577, 1958, pp. 14-18, 23-26, and 78-81.
Belkin et al, "Plastics in Armor materiel,Chapter 2: Prospective Plastics for Armor Applications; Chapter 4: Applications of Plactics in Servicing and Repair of Armor Materiel," U.S. Army Foreing Science and Technology Center Report: FSTC-HT-23-1105-71, Jul. 21, 1971, p. 3.
English translation of A.A. Kardashow et al., "Synthetische Kunststoffe", Moscow 1968, pp. 284-285 and 347-352.
EPA High Production Program Tesplan, Nov. 14, 2006.
Higgins, et al., "Butyl Rubber and Polyisobutylene in Adhesives and Sealants", Reprint from Handbook of Adhesives, 3rd Ed., 1990, pp. 1-6.
Indopol polybutenes brochure, "Indopol Polybutenes, delivering value through versatility," published by BP p.1.c., Aug. 2001.

(Continued)

Primary Examiner — Peter Szekely
(74) Attorney, Agent, or Firm — Gilberto M. Villacorta; Sunit Talapatra; Foley & Lardner LLP

(57) ABSTRACT

The invention relates to a composition for the protection of a shaped article against corrosion, said composition comprising (a) a polyisobutene having a glass transition temperature of less than −20° C. and surface tension of less than 40 mM/m at a temperature above the glass transition temperature of said polyisobutene, (b) a filler material and (c) an anti-oxidant composition. The anti-oxidant composition comprises a primary and/or a secondary anti-oxidant, the primary anti-oxidant being selected from the group consisting of sterically hindered phenol compounds. The invention further relates to a wrapping tape comprising said composition for the protection of a shaped article, a process for the manufacture of said wrapping tape and a process for covering a shaped article with said wrapping tape.

42 Claims, No Drawings

FOREIGN PATENT DOCUMENTS

| WO | WO 2004/009654 A1 | 1/2004 |
|---|---|---|
| WO | WO-2005/005528 A1 | 1/2005 |
| WO | WO 2008/056979 A3 | 5/2008 |

OTHER PUBLICATIONS

Marsalko et al., "Just Add PIBs. Polyisobutylenes are a vital part of adhesive and sealant formulations,"Adhesives & Sealants Industry (ASI), PIB Profile, As Seen in the May Issue, 4 pages.

Product information Ethanox® 702 by Albemarle Corporation, 2000.

Product information Irganox® 1010 by Ciba Specialty Chemicals Inc., 1998.

Technical data sheet Oppanol, May 1974.

Technical Information Report TI/ES 1417 us, "Oppanol B100, Oppanol B150, Oppanol B These types are used for production of adhesives, sealants, lubricants and coating compounds," BASF, Apr. 2003.

Young et al, "Polyisobutylene Tank Lining," Industrial and Engineering Chemistry, Jul. 1945, pp. 675-678.

BASF Technical Information, "Oppanol B 100, Oppanol B 150, Oppanol B 200," edit. TI/ES 1417 us, Apr. 2003, pp. 1-10.

BASF Technical Information, "Oppanol B types—Oppanol B 10 SFN, Oppanol B 11 SFN, Oppanol B 12 SFN, Oppanol B 13 SFN, Oppanol B 15 SFN" edit. TI/ES 1482 us, Sep. 2003, pp. 1-8.

BASF Technical Information, "Oppanol B types—Oppanol B 30 SF, Oppanol B 50 / B 50 SF, Oppanol B 80," edit. TI/ES 1415 us, Apr. 2003, pp. 1-11.

International Search Report, PCT/NL2004/000510, dated Oct. 13, 2004, 2 pages.

Kessel, BASF News Release, PIBinside "Oppanol—A bandage against rust," Mar. 22, 2007, 3 pages.

Peyser, "Glass Transition Temperatures of Polymers," Polymer Handbook, 3rd ed., 1989, pp. VI/209, VI/214.

STOPAQ Europe13 News, excerpt archived in 2007, 5 pages, http://web.archive.org/web/20070602031827/www.stopaq.com/en.

Wikipedia, "Glass transition," Sep. 12, 2010, 10 pages, found at http://en.wikipedia.org/wiki/Glass-transition.

Wikipedia, "Heat-shrink tubing," Sep. 12, 2010, 3 pages, found at http://en.wikipedia.org/wiki/Heat-shrink_tubing.

Willenbacher et al., "Polyisobutene-Based Pressure-Sentive Adhesives," Handbook of Pressure-Sensitive Adhesives and Products, 2003, pp. 4.1-4.2.

Wu, "Surface and Interfacial Tensions of Polymers, Oligomers, Plasticizers, and Organic Pigments," Polymer Handbook, 3rd ed., 1989, pp. VI 411-414.

* cited by examiner

COMPOSITION FOR THE PROTECTION OF A SHAPED ARTICLE AGAINST CORROSION

This application is a continuation application of U.S. application Ser. No. 12/473,120, filed May 27, 2009, now U.S. Pat. No. 7,887,925, which is a divisional application of U.S. application Ser. No. 10/564,516, filed Jan. 13, 2006, now U.S. Pat. No. 7,608,343, which is the National Stage application of International Application No. PCT/NL2004/000510, filed Jul. 14, 2004, all of which are hereby incorporated by reference in their entirety.

FIELD OF THE INVENTION

The present invention relates to a composition for the protection of a shaped article, in particular a shaped article made from or consisting essentially of one or more metals, metal compositions or alloys against corrosion. The present invention relates in particular to a composition for insulating and sealing a shaped article that is in contact with salts, moisture, water and other substances that are corrosive to a shaped article with the effect that said shaped article is protected against corrosion. The present invention also relates to a composition that can be used to protect subterranean shaped articles against corrosion. In the present invention, a shaped article is envisaged to encompass oil lines, oil pipes, gas lines, gas pipes, man hole covers, underground tanks, man hole covers, welding joints, flanges, crane hooks, thermit weldings in divisible shafts below the ground level and in T-joints and the like.

BACKGROUND OF THE INVENTION

For protecting shaped articles against corrosion a plurality of materials is employed. Shaped articles such as man hole covers, underground tanks, pipes, lines and the like are often made of metal, metal compositions or alloys and such shaped articles are subject to corrosion since they are in contact with salts, moisture, water and other corrosive components. Corrosion is obviously not preferred since it is detrimental to strength and must therefore be prevented or inhibited to extend the life cycle of the shaped article as much as possible.

Obviously, materials for preventing corrosion, in particular long-term corrosion, must have a long-term chemical, physical, mechanical and thermal stability. Moreover, as is well known in the art, the application of such materials is often a laborious, time-consuming and expensive process. The materials must further have a good adhesion on metals and other materials like polyethylene and polypropylene. Another requirement is that they have a very low permeability for water, salts, moisture, and the like.

Several materials for inhibiting or preventing corrosion are known in the art. Examples of such materials are bitumen and synthetic, thermosetting resins, e.g. epoxy resins and polyurethane resins. These materials have the disadvantage that a hard coating or seal is produced which can easily split or tear under the influence of for example mechanical stress. Another disadvantage of these materials is that volatile solvents are required when such materials are applied. After application of these materials, the solvents evaporate thereby leading to the formation of a micro-porous seal or coating which is at least permeably for corrosive substances such as salts, water and moisture. Nor are the solvents friendly to the environment.

Bitumen are also permeable for water and do generally not meet the requirements laid down by the KIWA ("Keuringsinstituut voor Waterleidingartikelen"; Dutch Inspection Institute for Water Supply Articles). Moreover, bitumen have in general a glass transition temperature of more than about 10° C. As a consequence, removal of bitumen is difficult under high temperature conditions, e.g. the summer, and formation of cracks can easily occur during low temperature conditions, e.g. the winter.

Synthetic, thermosetting resins are also easily split or torn as a result of mechanical stress. Moreover, they are not easily removed from the shaped article and easy removal is important when repairs have to be carried out to the shaped article or when the level of protection provided by the thermosetting resin needs to be checked. In addition, cleaning of the shaped article is also difficult which is required when a new seal or coating is applied so that complex and laborious cleaning techniques such as sand blasting have to be employed for cleaning the shaped article to a sufficient extent. It is obvious to the person skilled in the art that if the shaped article is a gas or oil line or pipe line of several hundreds of miles long, replacing or repairing a seal or coating made of synthetic, thermosetting resins is a time-consuming and expensive operation. Finally, applying a seal or coating based on synthetic, thermosetting resins in it self is difficult and laborious.

U.S. Pat. No. 5,898,044 discloses a composition having improved properties when compared with the materials discussed above. This composition comprises an apolar, non-thermosetting fluid polymer, e.g. polyisobutene, having a glass transition temperature lower than −20° C. and a surface tension of less than 40 mN/m at temperature above its glass transition temperature, and a filler material. The composition may contain an anti-oxidant such as 2,6-di-t-butyl-4-methylphenol (BHT). The composition can be used in combination with a shrink sleeve, a tape, a belt, a mat or a tape having an open cell structure. However, the composition according to U.S. Pat. No. 5,898,044 has certain disadvantages. For example, if the composition contains 2,6-di-t-butyl-4-methylphenol as the anti-oxidant, the present inventors have found that the anti-oxidant leaches out of the composition thereby deteriorating the protecting properties of the composition due to oxidative degradation of the non-thermosetting fluid polymer. This has the disadvantageous effect that the adhesive strength of the composition deteriorates over time when applied to a shaped article. Consequently, this sealing system have a reduced life cycle and requires earlier repair or replacement than desired. Since the sealing system is required to have a long life cycle, i.e. in general more than 50 years, and the application thereof is expensive and laborious, it is obvious to the person skilled in the art that such a sealing system needs improvement. Therefore, the inventors have investigated this technical problem and discovered that the decrease of adhesive strength is caused by leaching out of 2,6-di-t-butyl-4-methylphenol.

WO 99/56055 discloses a method for protecting a metal pipe against corrosion by applying a film to the metal pipe. The film comprises an outer layer, an intermediate layer and an inner layer. The outer layer is preferably made from a polymer, in particular high density polyethylene. The intermediate layer is preferably made of a metal, in particular aluminium. The inner layer comprises preferably an adhesive or mastic. The film must be applied by employing heat. As is obvious to the person skilled in the art, this method is laborious and time-consuming and inferior to the methods disclosed in U.S. Pat. No. 5,898,044.

WO 99/48997 discloses a composition comprising an organic material that is subjective to oxidative, thermal or light-induced degradation and two or more anti-oxidants, wherein the organic material may be selected from a wide range of materials including polyisobutene. According to page 44 of WO 99/43997, the compositions may be used in an extreme wide variety of applications, e.g. in lubricating oils, hydraulic fluids and in metal-working fluids. However, WO 99/48997 does not disclose that the composition can be used for protecting a shaped article against corrosion.

EP A 1.086.963 discloses an ethylene copolymer composition that can be used as a gasket, e.g. a corrosion-resistant pipe joint. Obviously, such a gasket is placed between two pipe ends when the pipes are joined together to prefer leakage.

SUMMARY OF THE INVENTION

The present invention relates to a composition for the protection of a shaped article against corrosion, said composition comprising:
(a) a polyisobutene having a glass transition temperature of less than $-20°$ C. and surface tension of less than 40 mM/m at a temperature above the glass transition temperature of said polyisobutene,
(b) a filler material, and
(c) an anti-oxidant composition, wherein said anti-oxidant composition comprises a primary and/or a secondary anti-oxidant, the primary anti-oxidant being selected from the group consisting of sterically hindered phenol compounds, provided that the sterically hindered phenol compound is not 2,6-di-t-butyl-4-methylphenol.

DETAILED DESCRIPTION OF THE INVENTION

Advantages of the present invention are that the compositions have an improved setting on the shaped article to be sealed or coated including an improved deformability and a very good adhesion, i.e. a very good adhesive power to the surface of the shaped article. The composition according to the invention does not set and therefore remains soft and is impermeable for water, moisture, salts and the like and is pore-tight. An additional and very important feature of the composition of the present invention that if a coating or seal made of the composition according to the invention is mechanically deformed to a relatively small extent, the damage is repaired automatically within a relatively short period time due to the fluid-like and/or visco-elastic nature of the composition of the invention. That is, the composition has self-recovering properties and any deformation or damage is repaired as a result of flow of the composition into holes or cavities caused by mechanical deformations or soil stresses. Consequently, the seal or coating comprising the composition according to the invention is not only smooth when applied, but even if indentations, imprints, dents, cavities and the like are caused by mechanical forces, they will disappear in due course and the smooth surface of the seal or coating reappears. Obviously, because of this fluid-like nature any seal or coating comprising the composition according to the present invention does not tear or break and does not build up internal stresses. Likewise, irregularities on the surface of the shaped article are perfectly filled or enveloped by the composition according to the invention where materials according to the state of the art often give rise to problems in such circumstances. The fluid-like and/or visco-elastic nature of the composition according to the invention also implies that it has no pot-life whereas protective coatings need to be applied within a certain period of time.

Other advantages of the composition according to the invention are a high chemical stability and resistance over a wide pH-range, excellent impact resistance, very good electrochemical impedance, a high cathodic protection performance, essentially no cathodic disbondment or undercreep corrosion. Additionally, the composition can be used within an operating temperature range of $-50°$ to $85°$ C.

There are more important advantages of the composition according to the present invention. Most protecting systems require the use of a primer before these systems are applied to the shaped article to provide sufficient adhesion. The use of a primer is unnecessary with the composition according to the present invention which implies that the composition can be applied within a shorter period of time thereby making the operation less expensive.

Coating systems have the disadvantage that, in particular under high-temperature conditions, suffer from loss of material which is not only costly but also detrimental to the environment and health of the user. Such problems do not occur when the composition according to the present invention is used. Other problems that do arise when coating systems are applied are that air bubbles may be formed in the coating which easily burst open thereby leading to pinholes in the coating layer and a poor protection. The present inventors have found that when the composition of the present invention is used, any air bubble present between the surface of the shaped article and the surface of the protective layer of the composition according to the invention migrates to the outer surface of the protective layer of the composition and diffuses away. In locations where the shaped article is in contact with salt, e.g. sea water, salt crystals are formed on the surface of the shaped article and before a coating system is applied to said surface, it requires thorough cleaning, i.e. by sand blasting, whereas the composition according to the invention encapsulates the salt crystals and removal of these crystals is not required. The necessity that for prior art protecting systems the salt crystals must be removed is that these crystals are hygroscopic and absorb water that permeates the protective layer. As a consequence, the salt crystals swell thereby causing cracks in the protective layer which eventually leads to a deteriorated protection to corrosion. In practice these salt crystals cause serious problems in the operation of shaped articles which require that the state of the art protective coatings must be replaced regularly. The composition according to the invention, however, does not suffer from such problems and is therefore much more economical to the end-user.

In a desert-like environment sand storms regularly occur. Any protective systems that must be applied by spray techniques cannot be used under such circumstances. However, the present inventors have found that the composition according the present invention can be applied without leading to an inferior protective layer.

Shaped articles can also directly be coated with the composition according to the invention under humid conditions, provided that condensation does not occur, whereas most systems according to the prior art can generally not be used under such conditions.

Shaped articles protected by the composition according to the invention can be easily inspected since a protective layer of the composition according to the invention can easily be removed and, after inspection, be reapplied. Most materials according to the state of the art are far more difficult to remove. Moreover, when removed the surface of the shaped article needs to be thoroughly cleaned before such materials are reapplied. Obviously, a protective layer of the composition according to the invention is also more easily tested.

Polyisobutene

According to the invention, the polyisobutene employed in the composition according to the present invention has a glass transition temperature of less than $-20°$ C., preferably less than $-40°$ C. and more preferably less than $-60°$ C. The surface tension of the polyisobutene is according to the present invention less than 40 mM/m at a temperature above the glass transition temperature of said polyisobutene. According to the invention, mixtures of different polyisobutenes may be used.

It is well known in the art that the glass transition temperature ($T_g$) is dependent from the molecular weight of a polymer, i.e. the higher the molecular weight, the higher the $T_g$. Consequently, the upper limit of the $T_g$ defines in fact a maximum for the molecular weight of the polyisobutene and excludes ultrahigh molecular weight polyisobutenes. Reference is for example made to Römpp Chemie Lexicon, 9th. edition, page 1587. According to Römpp Chemie Lexicon, 9th. edition, page 3539, polyisobutenes are commercially manufactured within a molecular weight range of about 300 to about 2.500.000. For example, BP manufactures Napvis and Hyvis (now sold under the trade name Indopol) having a $M_n$ range of about 180 to about 6000 and BASF manufactures these polymers under the trade name Oppanol; the grade Oppanol B 200 G has a $M_n$ of about 600.000. Although not many data for the glass transition temperature vs. molecular weight of commercially available polyisobutenes are known, it can be estimated that at a $M_n$ of about 5000 or higher the glass transition temperature is becomes lower than $-60°$ C.

The surface tension parameter is also used to define a certain class of polyisobutenes. In general, polymers having a relatively low surface tension have better flow, wetting and adhesion properties than polymers having a relatively high surface tension. Furthermore, it is also well known in the art that the surface tension increases with increasing molecular weight (and obviously also with increasing viscosity), although the increase above a molecular weight of about 2000-3000 is in general negligible and reaches about 1 mN/m of the value at infinite molecular weight. Reference is for example made to J. Bandrup, E. H. Immergut, Polymer Handbook, third edition (1989), page VI/412. Hence, in the present invention the surface tension is used to distinguish between very low molecular weight polyisobutenes from polyisobutenes according to the present invention and therefore defines a minimum of the molecular weight. The surface tension of polyisobutylene ($M_n$ 2700) is about 33.6 mN/m at 20° C. (cf. J. Bandrup, E. H. Immergut, Polymer Handbook, third edition (1989), page VI/414) whereas the surface tension of the low molecular weight polyisobutenes (up to a $M_n$ of 430) is about 22-27 mN/m. Hence, the polyisobutenes according to the invention have a surface tension less than 40 nM/m at a temperature that is higher than the glass transition temperature.

According to the invention, the most preferred polyisobutenes have preferably a $M_n$ (average molecular weight, viscosity average calculated according to $J_o = 3.06 \times 10^{-2} \times M_v^{0.65}$) in the range of 10000 to 100000, more preferably in the range of 15000 to 80000. The preferred molecular weight distribution $W_w/M_n$ is preferably not more than 4, more preferably not more than 3.5

Filler Material

The filler material according to the invention comprises preferably an inorganic material such as inorganic minerals, salts and oxides, e.g. chalk, boron sulphate, aluminium oxide, silicon dioxide, limestone, ground quartz, glass, talc, slate, bentonite and the like. However, it is preferred that the filler material has a density of about 2.0 to about 4.0 kg/dm³, preferably about 1.5 to about 3.5 kg/dm³, at 20° C. according to DIN ISO 787/10. It is furthermore preferred that the filler material consists essentially of an inorganic material, preferably at least 75 wt. %, more preferably at least 90 wt. % and most preferably at least 95 wt. %, based on the total weight of the filler material. It is furthermore preferred that the filler material has a very low water solubility, preferably of less than 0.1 g/l (20° C.; according to DIN ISO 787/8), more preferably less than 0.05 g/l. According to a particular embodiment of the present invention, the filler material consists essentially of calcium carbonate and a very suitable commercially available material is Omyalite 95T (available from Omya GmbH, Köln, Germany).

According to the invention, the composition comprises about 40 wt. % to about 80 wt. % of the filler material, preferably about 50 wt. % to about 70 wt. %, calculated on the total weight of the composition.

Anti-Oxidants

Properties of polymers, e.g. polyisobutenes, are strongly influenced by degradation reactions that may occur during production and uses. In many cases these degradation reactions are initiated by the presence of oxygen which may be catalysed by light, heat, water and metal ions. In initiation reactions free radicals are formed that in propagation reactions lead to the formation of unstable hydroperoxides. The hydroperoxides are the main initiators of thermal degradation and photodegradation processes.

Anti-oxidants are commonly used to prevent such degradation reactions wherein primary anti-oxidants interfere directly with propagation reactions leading to degradation, i.e. that they terminate such propagation reactions, whereas secondary anti-oxidants induce decomposition of the hydroperoxides.

According to the invention, the anti-oxidant composition comprises a primary and/or a secondary anti-oxidant, wherein the primary anti-oxidant is selected from the group consisting of sterically hindered phenol compounds, provided that the sterically hindered phenol compound is not 2,6-di-t-butyl-4-methylphenol. Furthermore, the primary anti-oxidant may comprise mixtures of sterically hindered phenol compounds. Likewise, the secondary anti-oxidant may comprise more than one secondary anti-oxidants.

The sterically hindered phenol compounds are preferably selected from the compounds according to formula (I):

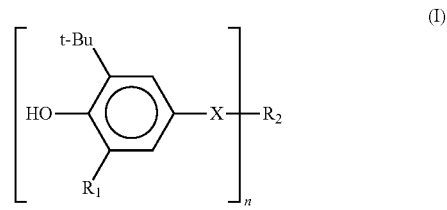

wherein $R_1$ is a $C_1$-$C_4$-alkyl group;
n is 1, 2, 3 or 4;
X is —$CH_2$—, —$CH_2$—$CH_2$—C(O)—Y— or —$CH_2$—C(O)—$CH_2$—$CH_2$—;
Y is —O— or —NH— is; and
if n=2, then X is —$CH_2$—$CH_2$—C(O)—Y— wherein Y is bonded to $R_2$, and $R_2$ is a $C_2$-$C_{12}$-alkylene group, a $C_4$-$C_{12}$-alkylene group that is interrupted by one or more oxygen atoms or sulphur atoms, or is a direct bond; and
if n=4, then X is —$CH_2$—$CH_2$—C(O)—Y— wherein Y is bonded to 2 and $R_2$ is $C_4$-$C_{10}$ alkanetetrayl.

The $C_1$-$C_4$ group encompasses methyl, ethyl, n-propyl, i-propyl, n-butyl, i-butyl and t-butyl. According to the invention, the preferred meaning for $R_1$ is t-butyl.

The $C_2$-$C_{12}$-alkylene group is preferably branched or linear. Examples of such groups are ethylene, propylene, tetramethylene, pep ethylene, hexamethylene, heptamethylene, octamethylene, decamethylene and dodecamethylene. $R_2$ is preferably a $C_2$-$C_{10}$-alkylene group, more preferably a $C_2$-$C_8$-alkylene group and in particular a $C_4$-$C_8$-alkylene group, typically hexamethylene.

The $C_4$-$C_{12}$-alkylene group that is interrupted by one more oxygen atoms or sulphur atoms is preferably a $C_4$-$C_{10}$-alkylene group, more preferably a $C_4$-$C_8$-alkylene group and in particular a $C_4$-$C_6$-alkylene group. Examples of suitable groups are:
—$CH_2$—O—$CH_2$—$CH_2$—O—$CH_2$—,
—$CH_2$—(O—$CH_2$—$CH_2$)$_2$—O—$CH_2$—,
—$CH_2$—(O—$CH_2$—$CH_2$)$_3$—O—$CH_2$—,
—$CH_2$—(O—$CH_2$—$CH_2$)$_4$—O—$CH_2$—,
—$CH_2$—$CH_2$—O—$CH_2$—$CH_2$—O—$CH_2$—$CH_2$— and
—$CH_2$—$CH_2$—S—$CH_2$—$CH_2$—.

Particularly preferred $C_4$-$C_{12}$-alkylene groups that are interrupted by one or more oxygen atoms or sulphur atoms are
—$CH_2$—$CH_2$—O—$CH_2$—$CH_2$—O—$CH_2$—$CH_2$— and
—$CH_2$—$CH_2$—S—$CH_2$—$CH_2$—.

According to the invention, $C_4$-$C_{10}$ alkanetetrayl is preferably (—$CH_2$)$_4$C.

Preferred sterically hindered phenol compounds according to the invention are those wherein in formula (I) n=1 and $R_2$ is $C_2$-$C_{20}$ alkyl. However, compounds that are more preferred are those wherein in formula (I) n=2, $R_2$ is $C_2$-$C_8$ alkylene, $C_4$-$C_8$ alkylene that is interrupted by a sulphur atom or an oxygen atom, or, if Y is —NH—, $R_2$ is additionally a direct bond and those wherein in formula (I) n=4 and $R_2$ is $C_4$-$C_8$ alkanetetrayl. Other preferred sterically hindered phenol compounds according to the invention are those wherein in formula (I) $R_1$ is t-butyl, n=1, 2 or 4, X is —$CH_2$—$CH_2$—C(O)—Y—, Y is an oxygen atom or —NH— and if n=1, then $R_2$ is $C_{14}$-$C_{18}$ alkyl; and if n=2, $R_2$ is $C_4$-$C_6$ alkylene or $C_4$-$C_6$ alkylene interrupted by an oxygen atom; and if n=4, $R_2$ is $C_4$-$C_8$ alkanetetrayl.

Suitable sterically hindered phenol compounds are for example disclosed in U.S. Pat. No. 5,763,512, incorporated by reference herein.

The sterically hindered phenol compounds are most preferably selected from the group consisting of Irganox™ 1330, Irganox™ 1010, Irganox™ 1098, Irganox™ 1076, Irganox™ 245, Irganox™ 259, Irganox™ 1035, Irganox™ 3114 and Irganox™ 3125. Even more preferably, the sterically hindered phenol compounds are selected from the group consisting of Irganox™ 1330, Irganox™ 1010.

Instead of or additional to the sterically hindered phenol compounds, a sterically hindered alkylthiomethylphenol or arylthiomethylphenol compound or a mixture of such compounds may be used. Such compounds are for example disclosed in U.S. Pat. No. 4,358,616.

These sterically hindered thiomethylphenol compounds are represented by formula (II):

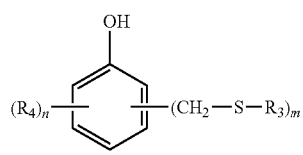

(II)

wherein $R_3$ is a $C_1$-$C_{12}$ alkyl group,
m is 1, 2 or 3,
$R_4$ is a $C_1$-$C_{12}$ alkyl group, a $C_1$-$C_2$ cycloalkyl group, a $C_6$-$C_{12}$ aryl group, a $C_7$-$C_{12}$ aralkyl group or a $C_7$-$C_{12}$ alkaryl group, and
n is an integer (5–m).

A suitable and preferred example of the compounds according to formula (II) is Irganox 1520, i.e. 2,4-di-octylthiomethyl-6-methyl phenol.

According to the invention, the secondary anti-oxidant is preferably selected from the group consisting of phosphites and thioesters. Suitable phosphites are for example disclosed in U.S. Pat. No. 5,763,512.

According to the invention, the phosphites are preferably selected from the compounds according to formulae (III-V):

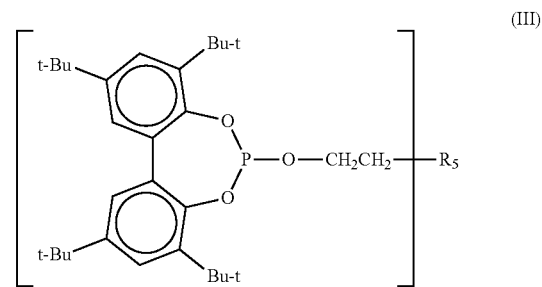

(III)

wherein R is a carbon atom, a nitrogen atom or an oxygen atom and wherein n is 2, 3 of 4;

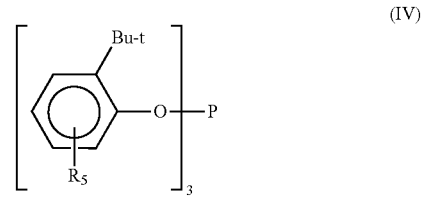

(IV)

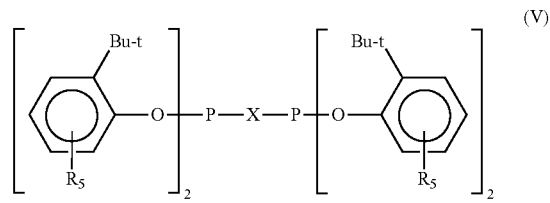

(V)

wherein $R_5$ is a $C_1$-$C_4$-alkyl group and X is a group as defined above for $R_2$ of formula (I) or a $C_6$-$C_{18}$-hydrocarbyl group, wherein the hydrocarbyl group comprises one or more arylene groups. According to the invention, suitable phosphites are Irgafos™ 168, Irgafos™ 12 and Irgafos™ P-EPQ.

The thioesters are preferably selected from the group of compounds represented by formula (VI): S—($R_6$—COO$R_7$)$_2$ wherein $R_6$ is a $C_1$-$C_{12}$ alkylene group, preferably a $C_1$-$C_6$ alkylene group, and wherein $R_7$ is a $C_1$-$C_{12}$ alkyl group, a $C_6$-$C_{12}$ aryl group, a $C_7$-$C_{12}$ alkaryl group or a $C_7$-$C_{12}$ aralkyl group.

In addition to the primary and secondary anti-oxidants, the anti-oxidant composition preferably comprises a further anti-oxidant selected from the group of lactones represented by formula (VII):

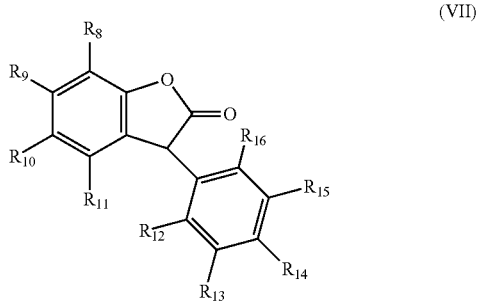

(VII)

wherein $R_8$-$R_{11}$ are independently hydrogen, halogen or $C_1$-$C_{12}$ alkyl and wherein $R_{12}$-$R_{16}$ are independently hydrogen, halogen or $C_1$-$C_{12}$ alkyl. Preferably, $R_8$-$R_{11}$ and $R_{12}$-$R_{16}$ are independently hydrogen or $C_1$-$C_{12}$ alkyl. More preferably, $R_8$ and $R_{10}$ are $C_1$-$C_6$ alkyl groups, $R_9$ and $R_{11}$ are hydrogens and $R_{12}R_{16}$ are independently hydrogen or $C_1$-$C_{12}$ alkyl groups. Even More preferably, $R_8$ and $R_{10}$ are $C_1$-$C_6$ alkyl groups, $R_9$ and $R_{11}$ are hydrogens, $R_{14}$ and $R_{15}$ are $C_1$-$C_6$ alkyl groups and $R_{12}$, $R_{13}$ and $R_{16}$ are hydrogens. Such lactones are for example disclosed in U.S. Pat. No. 6,310,220.

Wrapping Tape

The present invention also relates to a wrapping tape for the protection of a shaped article against corrosion, wherein the wrapping tape comprises:

(a) a first layer comprising a film, said film comprising a polymer or a copolymer of one or more α-olefins and/or diolefins, and (b) a second layer comprising a composition comprising:
  (i) a polyisobutene having a glass transition temperature of less than −20° C. and surface tension of less than 40 mM/m at a temperature above the glass transition temperature of said polyisobutene,
  (ii) a filler material, and
  (iii) an anti-oxidant composition, wherein said anti-oxidant composition comprises a primary and/or a secondary anti-oxidant, the primary anti-oxidant being selected from the group consisting of sterically hindered phenol compounds, provided that the sterically hindered phenol compound is not 2,6-di-t-butyl-4-methylphenol.

The wrapping tape according to the invention can be easily applied to the shaped article to be protected since the second layer (b) can easily be deformed. Moreover after being applied, the wrapping tape can also easily be removed. Although due to cohesive breakage it does leave some residuals on the surface of the shaped article, these residuals can be easily removed by scraping. Additionally, the wrapping tape can in particular be applied to T-joints and the like. Furthermore, the wrapping tape according to the invention can suitably be used for repairing damaged or corroded shaped articles that were already provided with some protecting material according to the state of the art, provided that the surface of the shaped article is cleaned to a St-2 level according to the NEN-EN-ISO standard 8501-1. Finally, as described above, the wrapping tape has self repairing properties due to the fluid and/or visco-elastic nature of layer (b).

If necessary, the wrapping tape may comprise a further layer (c) to protect layer (b). Moreover, the wrapping tape preferably has between layers (a) and (b) a further layer (d) comprising a reinforcing net-like layer having a woven, knitted or spool-knitted structure and that can be deformed in two orthogonal directions. The reinforcing net-like layer can be manufactured from polyolefin fibres, e.g. fibres made from ethane homopolymers or copolymers or propene homopolymers or copolymers, as is well known in the art.

Layer (a) of the wrapping tape preferably comprises a polymer or a copolymer of one or more α-olefins and/or diolefins. Examples of such polymers and copolymers are EP(D)M elastomers, ethylene homopolymers, ethylene-α-olefin copolymers, propylene homopolymers and propylene-α-olefin copolymers. If the copolymer is an ethylene copolymer which is a preferred embodiment of the invention, the α-olefin is then preferably a $C_3$-$C_{12}$ α-olefin, in particular a $C_3$-$C_8$ α-olefin. Examples of suitable α-olefins are propene, 1-butene, 1-hexene and 1-octene. The ethylene copolymers preferably comprise 0.1 to 30 wt. %, in particular 0.1 to 20 wt. % α-olefin. The density of the ethylene homopolymers or copolymers (as measured according to ASTM D 1248) is preferably 0.800-0.975 g/cm$^3$, in particular 0.850-0.950 g/cm$^3$. The melt index (as measured according to ASTM D 1238) of the ethylene homopolymers or copolymers is preferably 0.1 to 50 g/min., in particular 0.2 to 20 g/min. Layer (a) of the wrapping tape comprises preferably one or more of the following polymers: low density polyethylene (LDPE), linear low density polyethylene (LLDPE), high density polyethylene (HDPE), an ethene propene copolymer, an ethene propene diene copolymer. According to a preferred embodiment of the invention, layer (a) of the wrapping tape comprises LDPE, HDPE or LLDPE or a combination thereof.

Obviously, layer (a) may comprise more than one layer and can for example be a multilayer film comprising of LLDPE outer layers and a HDPE inner layer. Such multilayer films are well known in the art.

Layer (a) may further comprise different additives such as pigments and fillers.

The wrapping tape according to the invention has preferably a total thickness of about 1.0 to about 3.0 cm, more preferably about 1.2 to about 2.8 cm. The width of the wrapping tape ca obviously adjusted as desired or as suitable, but is preferably about 3.0 to about 50.0 cm, more preferably about 4.0 to about 40.0 cm. The thickness of layer (a) is preferably about 10 µm to about 500 µm, more preferably about 20 µm to about 300 µm.

The invention also relates to a process for the manufacture of a wrapping tape for the protection of a shaped article against corrosion, wherein a composition comprising:
(i) a polyisobutene having a glass transition temperature of less than −20° C. and surface tension of less than 40 mM/m at a temperature above the glass transition temperature of said polyisobutene,
(ii) a filler material, and
(iii) an anti-oxidant composition, wherein said anti-oxidant composition comprises a primary and/or a secondary anti-oxidant, the primary anti-oxidant being selected from the group consisting of sterically hindered phenol compounds, provided that the sterically hindered phenol compound is not 2,6-di-t-butyl-4-methylphenol,
is laminated onto a film, said film comprising a polymer or a copolymer of one or more α-olefins and/or diolefins.

After said lamination step, the surface of layer (b) not being in contact with layer (a) is preferably protected by a layer (c), wherein layer (c) may be any suitable material that comprises an olefin polymer or copolymer, paper and the like.

If a layer (d) is present between layers (a) and (b) as described above, layers (a) and (d) are first laminated where after a layer (b) is applied to the surface of layer (d) opposite the surface of layer (d) that is in contact with layer (a). The thickness of layer (b) is controlled by e.g. a knife.

After the wrapping tape is manufactured, it is preferably wrapped around a bobbin or a spool.

Another important advantage of the wrapping tape according to the invention is the following. It is known in the art that sulphate-reducing bacteria are frequently encountered in defects in the protective layer of subterranean shaped articles. These bacteria are capable of producing hydrogen sulphide that is known to promote metal corrosion (cf. for example S. Grobe et al., Materials and Corrosion, Vol. 47, pages 413-424, 1996; M. J. Feijo et al., Materials and Corrosion, Vol. 651, pages 691-697, 2000). Since during the application of a protective layer infection and inclusion may occur, it is essential that components that promote bacterial growth do not permeate during the protective layer. Moreover, it is believed that at least one of the essential elements (in particular carbon, hydrogen, oxygen and nitrogen) are must be absent in order to prevent the growth of such bacteria. Since the wrapping tape according to the invention has a low permeability for (air, i.e. nitrogen, oxygen and water vapour) and is water resistant and is free of nitrogen containing compounds (unless a particular anti-oxidant is used that contains nitrogen; it is believed, however, that this is not detrimental given the fact that only small amounts of anti-oxidants are added), the inventors believe that with the wrapping tape according to the invention corrosive problems due to such micro-organisms do not occur.

Finally, the inventors have noted that with protective systems like butyl rubber (which is spirally applied to shaped articles such as pipe lines) corrosion occurs in the areas of overlap between different windings ("spiral corrosion") due to the fact that in the areas of overlap the rather stiff butyl rubber windings are not in intimate contact so that occlusion of air, water vapour and the like occurs. Such problems do, however, not occur with the wrapping tape according to the invention because of the fluid and/or visco-elastic nature of layer (b).

The present invention further relates to a process for covering a shaped article with a wrapping tape, wherein the wrapping tape comprises:
(a) a first layer comprising a film, said film comprising a polymer or a copolymer of one or more α-olefins and/or diolefins, and
(b) a second layer comprising a composition comprising:
 (i) a polyisobutene having a glass transition temperature of less than −20° C. and surface tension of less than 40 mM/m at a temperature above the glass transition temperature of said polyisobutene,
 (ii) a filler material, and
 (iii) an anti-oxidant composition, wherein said anti-oxidant composition comprises a primary and/or a secondary anti-oxidant, the primary anti-oxidant being selected from the group consisting of sterically hindered phenol compounds, provided that the sterically hindered phenol compound is not 2,6-di-t-butyl-4-methylphenol According to the invention, wherein the surface of the shaped article is preferably cleaned to a St-2 level according to NEN-EN-ISO Standard 8501-1 prior to the application of the wrapping tape. The St-2 level is defined as: "Thorough scraping and brushing; hand tools and/or machine brushing/grinding is acceptable. Loose mill scale, rust and foreign matter must be fully removed. Finally, the surface should be cleaned with a vacuum cleaner, clean dry compressed air or a clean brush. Surface should have a faint metallic sheen (no anchor pattern is required)".

The wrapping tape is preferably wrapped around the shaped article such that subsequent layers of the wrapping tape overlap each other, wherein the overlap has preferably a width of at least 1.0 mm, more preferably a width of at least 5.0 mm and in particular a width of at least 10.0 mm. Obviously, greater widths, e.g. about 50.0 mm are also possible but that is also dependent from the width of the wrapping tape used as will be obvious to the person skilled in the art. It is, however, necessary that the width of the overlap is at least 1.0 mm to obtain a proper sealing. Moreover, the first and last windings are preferably applied essentially perpendicular to the wrapping direction, that is if the shaped article is for example a pipe line, the first and last windings are applied essentially circumferential and essentially perpendicular to the length of the pipe line. If the end of a first wrapping tape is reached, a second wrapping tape may be applied where the first wrapping tape expired, provided that the longitudinal overlap is at least 1.0 mm, preferably at least 5.0 mm and most preferably at least 10.0 mm. The wrapping tape is preferably applied without tension.

According to the invention, it is preferred that after the wrapping tape has been applied, an outerwrap film is wrapped around the shaped article. Preferably the outerwrap film is selected from films comprising one or more polyolefins that are preferably selected from the group consisting of ethylene homopolymers, ethylene copolymers, ethylene vinylchloride copolymers, vinylchloride polymers and ethylene vinylacetate copolymers. According to a preferred embodiment of the invention, the outerwrap film is a PVC film. The outerwrap film is preferably applied with tension.

Preferably, the outerwrap film is wrapped such that the width of the overlap is at least 20% of the width of the outerwrap film, preferably at least 40% of the width of the outerwrap film.

The invention will be further illustrated by the following examples which are, however, not intended to restrict the scope of the invention by any means.

EXAMPLES

Example 1

In this example the water permeability of the wrapping tape according to the present invention was compared with that of several commercially available materials at similar thickness. The data show the excellent performance of the composition according to the invention, i.e. it has the lowest permeability for water.

| Material | P (H$_2$0) * 10$^{-13}$ Pa · cm$^2$/s |
|---|---|
| Bitumen | 840 |
| EPDM | 157 |
| Butyl rubber | 82.5 |
| LDPE | 68 |
| Polypropylene (95% isotactic) | 51 |
| Wrapping tape according to the invention | 35.5 |

Example 2

In this example, a composition comprising polyisobutene and 2,6-di-t-butyl-4-methylphenol (BHT; supplied by Bax Chemicals B.V., The Netherlands) as the anti-oxidant were tested relative to the neat polyisobutene. The polyisobutylene was Oppanol B10 N (containing about 0.04 wt. % BHT) supplied by BASF, The Netherlands, having a $M_n$ of 24000 and a $M_v$ of 40000. The filler material was Omyalite 95T supplied by Omya GmbH, Germany.

The tests that were performed were:
1. Thermogravimetric analysis. This test provided data of the weight loss of the polyisobutene as function of the temperature. The analysis was performed in the presence of air at a temperature of 60° and 85° C. Data are shown in Table 1.
2. Determination of adhesion strength. The composition according to the invention was used in combination with a plastic tape. The composition contained 38.6 wt. % Oppanol B10 N, 60.3 wt. % Omyalite 95T, 0.06 wt. % pigment (green) and 1.0 wt. % BHT. The size of the sample was 4.9×13 cm of which 3.5 cm was applied to a steel plate having a size of 4.8×7.1 cm. The adhesion strength was determined by using a tensile testing machine (Zwick, 5 KN). The drawing rate was 300 mm/min. Data are shown in Table 2; the standard deviation of the load data is about 0.003 so that a load of 0.0562±0.003 implies that the adhesive strength is unchanged.

TABLE 1

Formulations (wt. %, calculated on weight of total composition)

|  | A | B |
|---|---|---|
| Oppanol B10 N | 100.00 | 99.00 |
| BHT | 0.00 | 1.00 |
| Weight loss (%) at 60° C. | | |
| 1 Day | 0.02 | 0.07 |
| 3 Days | 0.06 | 0.09 |
| 5 Days | 0.04 | 0.09 |
| 10 Days | 0.06 | 0.15 |
| Weight loss (%) at 85° C. | | |
| 1 Day | 0.00 | 0.08 |
| 3 Days | 0.09 | 0.12 |
| 5 Days | 0.08 | 0.12 |
| 10 Days | 0.13 | 0.23 |

The data of Table 1 show that BHT leaches out.

TABLE 2

| Exp. | Subjected to | Max. load (kN) | Loss of adhesive strength |
|---|---|---|---|
| 1 | RT (reference) | 0.0562 | N.a. |
| 2 | 1 week, 60° C. | 0.0558 | No |
| 3 | 1 week, −20° C. | 0.0551 | No |
| 4 | 5 days, 150° C. | Brittle, break of seal | Yes |
| 5 | 1 week, 85° C. | 0.0491 | Yes |
| 6 | 2 weeks, 85° C. | No adhesion | Yes |
| 7 | 1 week, −20° C. | 0.0552 | No |

The data of Table 2 show that under various conditions the adhesive strength decreases over time. This is caused by the fact that BHT leaches out of the composition thereby providing insufficient protection to the polyisobutene.

Example 3

The composition according to the invention was subjected to an ageing test and an accelerated ageing test. I these tests, the composition according to the invention was compared with a similar composition containing BHT as the anti-oxidant. All tested compositions contained 1.0 wt. % of antioxidant or anti-oxidant composition, based on the total composition (cf. Table 3).

TABLE 3

| Formulation | Anti-oxidant (1.0 wt. %) |
|---|---|
| E | BHT |
| F | Irganox 1010/Irgaphos 168 (50:50 w/w) |
| G | Irganox 1010 |
| H | Irganox 1330 |

Ageing Test

Corroded steel pipes were brushed clean by using a wire brush. The steel pipes were subsequently laminated with a wrapping tape comprising the compositions and a polyethylene film. In a climatic cabin the steel pipes were immersed in a brine solution and subjected to the following cycle: 4 h at 85° C., 6 h from −20° C. to 85° C., 4 h at −20° C. and 6 h from 85° C. to −20° C. The cycle was repeated 135 times which according to the standard for cable sleeves of Deutsche Telekom AG corresponds with a life cycle of 107.5 years. After this test, the $M_n$ of the polyisobutene (the polyisobutene had originally a $M_n$ of 24000) was determined by GPC (the polyisobutene was isolated by soxhlet extraction using hexane as the solvent, the solvent was evaporated and the residue was dissolved in THF (2 mg/ml). The GPC apparatus used was a Spectra Physics P 1000 (light diffraction detection). The flow was 1 ml/min. and the column used was a Waters F6. An increase of the $M_n$ implies a reduced adhesive strength. Data are shown in Table 4.

TABLE 4

| Formulation | Relative change of $M_n$ (%) |
|---|---|
| E | 147 |
| F | 107 |
| G | 108 |
| H | 108 |

The data in Table 4 shows that formulation E (containing BHT) showed the largest increase of the $M_n$.

Accelerated Ageing Test

Formulations E-H were mixed with rust. The samples were stored in an oven at 85° C. for six months. Thereafter, the polyisobutene was isolated as described above and analysed by FT-IR. The spectra of the formulations were superimposed on each other and the relative absorption was determined at the wavelength region of 1730 cm$^{-1}$. In Table 5 the absorption data are shown.

TABLE 5

| Formulation | Absorption units (1729 cm−1) |
|---|---|
| E | 0.011 |
| F | 0.004 |
| G | 0.004 |
| H | 0.000 |

The data in Table demonstrate that oxidation of the polyisobutene in the formulation containing BHT occurred to a higher extent than in the other samples.

Example 4

Pipe spools (diameter of about 10 cm; length of about 10 cm) were subsequently coated with a wrapping tape comprising the compositions (total thickness about 3 mm) and a PVC film. Coated test panels were also used in the field test. This test comprised the following tests:
  Holiday detection
  Chemical resistance tests
  Impact resistance tests
  Electrochemical impedance tests Holiday Detection This test was performed according to ASTM G 62 (Method B) using a Elcometer 236 Holiday Detector. At 3000 V no holidays could be detected in the coated spools and panels.

Chemical Resistance

Samples of the compositions according to the invention were immersed in aqueous solutions at pH 4, 7 and 10 (pH adjusted by HCl or NaoH) and kept at about 23° C. for one week. Thereafter, the pH of 4 was decreased to 3 whereas the pH of 10 was increased to 11 and the samples were again kept under these conditions for one week. After this period, the pH of 3 was decreased to 2 and the pH of 11 was increased to 12 and the samples were kept under these conditions for three weeks. At the end of the test (i.e. five weeks) no change in colour or in weight could be determined demonstrating that the compositions are stable under these conditions which is essential for long-term corrosion protection.

Impact Resistance

This test was performed according to ASTM G14. The tests were performed using 4 lb weight at two different force levels of 6, 10 and 15 Joule at room temperature. After testing, the areas (dents) were visually examined for damage and tested using a Elcometer 269 Pinhole detector. The dent obtained after testing at 6 Joule disappeared quickly whereas the dents obtained after testing at 10 and 15 Joule partially recovered. No holidays were detected. These results demonstrate the high impact resistance and self recovering characteristics of the compositions according to the invention.

Electrochemical Impedance

Electrochemical impedance spectroscopy measurements were conducted on the coated spools and coated tests panels. Two commercially available corrosion protective materials were tested as well for comparison. The measurements were conducted by using a computer controlled EG & G Frequency Response Analyser (Model 1025) in conjunction with a EG & G potentiostat/galvanostat (Model 283). The impedance results are shown in Table 6.

TABLE 6

| Coating | Impedance (ohm · cm$^2$) |
|---|---|
| Composition according to invention | $2.1 \times 10^{10}$ |
| Commercial material 1 ("tape" type) | $1.3 \times 10^9$ |
| Commercial material 2 (liquid) | $3.1 \times 10^9$ |

This test revealed that the composition according to the invention has better corrosion protective characteristics than the commercially available materials.

Example 5

A wrapping tape comprising the composition according to the invention (total thickness 1.8 mm; polyethylene film used as backing) was applied to a cleaned (St-2 level according to NEN-EN-ISO standard 8501-1) steel pipe surface by wrapping spirally without tension. The subsequent turns had an overlap of about 10 mm. Next a PVC film (thickness 0.5 mm; 50% overlap of the turns) was applied using tension ensuring good contact between the composition according to the invention and the surface of the steel pipe. A holiday test at 20 kV revealed that holidays were not present.

Further evaluations were performed according to the European Standard EN 12068, "External organic coatings for the corrosion protection of buried and immersed steel pipelines used ion conjunction with cathodic protection—Tapes and Shrinkable Materials", 1998. The composition according to the invention was compared to the C-class products (highest class). Impact resistance tests (ASTM G14) showed an impact resistance of 16.8 Joule (requirement at least 15 Joule). Indentation resistance tests revealed a residual thickness after indentation of 0.74 mm (requirement at least 0.6 mm). The electrical insulation resistance was at least 1.15× $10^8$ ohm·m$^2$ (requirement at least $10^8$ ohm·m$^{-2}$). Cathodic Disbonding tests (ASTM G 95 and ASTM G 8) revealed a disbonding of 3.1 mm at room temperature and 6.8 mm at 50° C. (requirement less than 10 mm which is the most stringent requirement).

What is claimed is:

1. A wrapping tape for the protection of a shaped article against corrosion, wherein the wrapping tape comprises:
   (a) a first layer comprising a film, said film comprising a polymer or a copolymer of one or more alpha-olefins or diolefins;
   (b) a second layer, wherein 40 to 80 weight percent of the second layer comprises a filler selected from the group consisting of inorganic minerals, salts and oxides; and
   (c) a reinforcing layer;
   wherein the wrapping tape is wrapped around a bobbin or spool.

2. The wrapping tape of claim 1 wherein the reinforcing layer is woven.

3. The wrapping tape of claim 1 wherein the reinforcing layer is knitted.

4. The wrapping tape of claim 1 wherein the reinforcing layer is spool-knitted.

5. The wrapping tape of claim 1 wherein the reinforcing layer comprises polyolefin fibers.

6. The wrapping tape of claim 1 wherein the reinforcing layer comprises polyolefin fibers selected from ethylene homopolymers or copolymers or propene homopolymers or copolymers.

7. The wrapping tape of claim 1 wherein the wrapping tape further comprises a protective layer (d) to protect layer (b).

8. The wrapping tape of claim 1 wherein the polymer of said film in the first layer is selected from the group consisting of EPDM elastomers, ethylene homopolymers, ethylene-alpha-olefin copolymers, propylene homopolymers and propylene-alpha-olefin copolymers.

9. The wrapping tape of claim 1 wherein the second layer comprises a filler selected from the group consisting of chalk, boron sulphate, aluminum oxide, silicon dioxide, limestone, ground quartz, glass, talc, slate, and bentonite.

10. The wrapping tape of claim 1 wherein the second layer comprises a filler which is calcium carbonate.

11. The wrapping tape of claim 1 wherein the second layer comprises a filler which has a density of about 2.0 to about 4.0 kg/dm$^3$ at 20° C. according to DIN ISO 787/10.

12. The wrapping tape of claim 1 wherein the second layer comprises a filler which has a water solubility of less than 0.1 g/l at 20° C. according to DIN ISO 787/8.

13. The wrapping tape of claim 1 wherein said wrapping tape has a water permeability of $35.5 \times 10^{-13}$ Pa cm/s$^2$ or less.

14. The wrapping tape of claim 1 wherein said wrapping tape is capable of protecting a pipe spool from holidays according to ASTM G 62 (Method B) at 3000V.

15. The wrapping tape of claim 1 wherein said wrapping tape is stable over a pH range of 2 to 12 for a five week test period at 23° C.

16. The wrapping tape of claim 1 wherein said wrapping tape has an electrical resistance of at least $1.15 \times 10^8$ ohm/m$^2$.

17. The wrapping tape of claim 1 wherein said wrapping tape has a cathodic disbanding of less than 10 mm according to ASTM G 95.

18. The wrapping tape of claim 1 wherein said wrapping tape has a cathodic disbanding of less than 10 mm according to ASTM G 8.

19. The wrapping tape of claim 1 wherein said wrapping tape can be used within an operating temperature of −50° C. to 85° C.

20. The wrapping tape of claim 1 wherein the first layer has a thickness of from about 10 μm to about 500 μm.

21. The wrapping tape of claim 1 wherein said wrapping tape has a total thickness of about 1.0 to about 3.0 cm and a width of from about 3.0 to about 50.0 cm.

22. The wrapping tape of claim 1, wherein the second layer is laminated onto the film of said first layer.

23. The wrapping tape of claim 1, wherein the reinforcing layer is between said first layer and said second layer.

24. The wrapping tape of claim 1, wherein said film comprising a polymer selected from ethylene homopolymer or ethylene-α-olefin copolymers.

25. A wrapping tape for the protection of a shaped article against corrosion, wherein the wrapping tape comprises:
(a) a first layer comprising a film, said film comprising a polymer selected from ethylene homopolymer or ethylene-α-olefin copolymers;
(b) a second layer which is laminated onto the film of said first layer and comprises:
(i) a polyisobutene having a glass transition temperature of less than −60° C., a surface tension of less than 40 mM/m at a temperature above the glass transition temperature of said polyisobutene, an average molecular weight (Mn) of from about 180 to about 6000 or from 15,000 to 80,000, and a molecular weight distribution (Mw/Mn) of not more than 4; and
(ii) a filler comprising an inorganic mineral; and
(c) a reinforcing layer.

26. The wrapping tape of claim 25 wherein the wrapping tape is wrapped around a bobbin or spool.

27. The wrapping tape of claim 25 wherein the inorganic mineral in the second layer comprises chalk or talc.

28. The wrapping tape of claim 25 wherein the inorganic mineral in the second layer comprises calcium carbonate.

29. The wrapping tape of claim 25 wherein said second layer further comprises an antioxidant.

30. The wrapping tape of claim 25 wherein the reinforcing layer is between layers (a) and (b).

31. The wrapping tape of claim 25 wherein the reinforcing layer comprises polyolefin fibers.

32. A wrapping tape for the protection of a shaped article against corrosion, wherein the wrapping tape comprises:
(a) a first layer comprising a film;
(b) a second layer which is laminated onto the film of said first layer and comprises:
(i) a polyisobutene having a glass transition temperature of less than −60° C., a surface tension of less than 40 mM/m at a temperature above the glass transition temperature of said polyisobutene, an average molecular weight (Mn) of from about 300 to about 2,500,000, and a molecular weight distribution (Mw/Mn) of not more than 4;
(ii) a filler comprising an inorganic material with a water solubility of less than 0.1 g/l at 20° C. according to DIN ISO 787/8; and
(iii) a sterically hindered phenol compound; and
(c) a reinforcing layer.

33. The wrapping tape of claim 32 wherein the wrapping tape is wrapped around a bobbin or spool.

34. The wrapping tape of claim 32 wherein the inorganic mineral in the second layer comprises chalk or talc.

35. The wrapping tape of claim 32 wherein the inorganic mineral in the second layer comprises calcium carbonate.

36. The wrapping tape of claim 32 wherein said second layer further comprises an antioxidant.

37. The wrapping tape of claim 32 wherein the reinforcing layer is between layers (a) and (b).

38. The wrapping tape of claim 32 wherein the reinforcing layer comprises polyolefin fibers.

39. The wrapping tape of claim 1, wherein the second layer is capable of being deformed.

40. The wrapping tape of claim 1, wherein the second layer comprises a polyisobutene having a glass transition temperature of less than −20° C.

41. The wrapping tape of claim 25, wherein the second layer is capable of being deformed.

42. The wrapping tape of claim 32, wherein the second layer is capable of being deformed.

* * * * *